United States Patent
Li et al.

(10) Patent No.: US 9,710,530 B2
(45) Date of Patent: Jul. 18, 2017

(54) PERFORMANCE CHECKING COMPONENT FOR AN ETL JOB

(71) Applicant: International Business Machines Corporation, Armonk, NY (US)

(72) Inventors: Jeff J. Li, Parkland, FL (US); Wendi L. Nusbickel, Boca Raton, FL (US); James G. Tsimis, Warren, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/234,139

(22) Filed: Aug. 11, 2016

(65) Prior Publication Data

US 2016/0342666 A1  Nov. 24, 2016

Related U.S. Application Data

(63) Continuation of application No. 14/291,421, filed on May 30, 2014.

(51) Int. Cl.
*G06F 17/30* (2006.01)
*G06F 11/34* (2006.01)
(Continued)

(52) U.S. Cl.
CPC .... *G06F 17/30563* (2013.01); *G06F 11/2268* (2013.01); *G06F 11/302* (2013.01); *G06F 11/3006* (2013.01); *G06F 11/3409* (2013.01)

(58) Field of Classification Search
None
See application file for complete search history.

(56) References Cited

U.S. PATENT DOCUMENTS 7,003,560 B1  2/2006  Mullen et al.
8,269,789 B2  9/2012  Raspl et al.
(Continued)

FOREIGN PATENT DOCUMENTS

EP  1987425 A1  11/2008
EP  2079020 A1  7/2009

OTHER PUBLICATIONS

Egogics, "Simple Network Management Protocol (SNMP)", eogogics inc., Knowledge Center: Tutorial, © 2005-2013 eogogics. http://www.eogogics.com/talkgogics/infocenter/SNMP.
(Continued)

*Primary Examiner* — Tony Mahmoudi
*Assistant Examiner* — Alex Gofman
(74) *Attorney, Agent, or Firm* — Jared L. Montanaro

(57) ABSTRACT

Generation of a performance determination report for an Extract, Transform, Load (ETL) job includes decomposing the ETL job into two or more stage instances, and identifying one or more conditions for each of the stage instances. A set of tests for each of the identified conditions are generated. A first set of test results are generated by performing the set of tests. It is determined whether a test result from the first set of test results is outside of a first range. Conditions that can be identified include a non-volatile free memory condition, a network reliability condition, a network configuration condition, an application availability condition, a database availability condition, a database performance condition, a schema validity condition, an installed libraries condition, a configuration parameter condition, a volatile free memory condition, and a third party tool condition.

1 Claim, 7 Drawing Sheets

(51) Int. Cl.
*G06F 11/22* (2006.01)
*G06F 11/30* (2006.01)
*G06F 15/16* (2006.01)

(56) References Cited

U.S. PATENT DOCUMENTS

| | | |
|---|---|---|
| 8,307,025 B2 | 11/2012 | Alba |
| 8,386,419 B2 | 2/2013 | Yalamanchilli |
| 9,298,596 B2 | 3/2016 | Caufield et al. |
| 2006/0218285 A1 | 9/2006 | Talwar et al. |
| 2009/0077017 A1 | 3/2009 | Belknap et al. |
| 2011/0270833 A1 | 11/2011 | von Kaenel et al. |
| 2011/0296383 A1 | 12/2011 | Pasternak |
| 2012/0054472 A1 | 3/2012 | Altman et al. |
| 2012/0154405 A1 | 6/2012 | Baumgartner et al. |
| 2012/0265726 A1 | 10/2012 | Padmanabhan et al. |
| 2014/0279934 A1 | 9/2014 | Li et al. |
| 2015/0020049 A1 | 1/2015 | Caufield et al. |
| 2015/0347261 A1 | 12/2015 | Li et al. |

OTHER PUBLICATIONS

IBM, "Configuring the DB2 Connector as a Source", IBM InfoSphere Information Server, Information Center, Dec. 14, 2012. http://pic.dhe.ibm.com/infocenter/iisinfsv/v9r1/index.jsp?topic=%2Fcom.ibm.swg.im.iis.conn.db2db.usage.doc%2Ftopics%2Fiisdb2_configsource.html&resultof%3D%%20%3E%3E%20pic.dhe.pic.dhe.ibm.com/infocenter/iisinfsv/v9r1/index.jsp?topic=/com.ibm.swg.im.iis.conn.db2db.usage.doc/topics/iisdb2_configsource.html&resultof=%.

IBM, "Connectivity Guide for IBM DB2 Databases", IBM InfoSphere DataStorage and QualityStage, Version 9, Release 1, (Chapter 2, p. 19).

IBM, "Download the ISALite for InfoSphere Information Server tool Version S9.1.007.5", IBM Support Assistant (ISA) Lite for Information Server. http://www-01.ibm.com/support/docview.wss?uid=swg24022700.

Java, "Overview of Monitoring and Management", copyright © 2004 Sun Microsystems, Inc. http://docs.oracle.com/javase/1.5.0/docs/guide/management/overview.html.

List of IBM Patents or Patent Applications Treated as Related, Aug. 5, 2016, 2 pgs.

PERFORMANCE CHECKING COMPONENT FOR AN ETL JOB

BACKGROUND

The present disclosure relates to systems that run Extract, Transform, and Load (ETL) jobs and, more particularly, to a performance checking component for an ETL job.

Extract, Transform, and Load ("ETL") jobs extract information from various sources, transform the data, and store it in one or more targets. For example, an ETL job may extract data from various applications and databases. The source systems may be managed and operated by different functional entities within an enterprise, which use their source systems for different purposes. The sources may be diverse systems hosted on different hardware located at multiple locations. In addition, the sources may organize and store data in different formats. After extracting data, the ETL job typically transforms the data into a single, homogeneous format. The data may be transformed using a variety of rules, functions, and algorithms. The transform stage may include a variety of steps that are hosted on different hardware. Once transformed, the transformed data is loaded to one or more targets, such as a database or data warehouse. Where there is more than one target, the targets can be hosted on different hardware located at multiple locations.

ETL jobs are complex. Because of this complexity, and the multiple, distributed components, it can be difficult to identify sources of performance problems with an ETL job.

SUMMARY

According to various embodiments, a computer-implemented method generates a performance determination report for an Extract, Transform, Load (ETL) job. The method, which is performed by a processor, includes decomposing an ETL job into two or more stage instances, and identifying one or more conditions for each of the stage instances. In addition, the method includes generating a set of tests for each of the identified conditions. A first set of test results are generated by performing the set of tests. Further, the method includes determining whether a test result from the first set of test results is outside of a first range, and generating the performance determination report. The performance determination report can include various test results.

The list of conditions are selected from a group consisting of a non-volatile free memory condition, a network reliability condition, a network configuration condition, an application availability condition, a database availability condition, a database performance condition, a schema validity condition, an installed libraries condition, a configuration parameter condition, a volatile free memory condition, and a third party tool condition.

In various embodiments, the determining of whether a test result from the first set of test results is outside a first range includes: comparing the test result with another test result for the same test performed at a second time. The second time is prior to a first time and the generating of the first set of test results is performed at the first time.

In some embodiments, the method can include determining the first range for the test result. The determining the first range can include calculating one or more statistical metrics from two or more historical test results.

In various embodiments, the method can include saving the first set of test results to an archive. In addition, the method can include accepting a user input to modify a test of the sets of tests. Moreover, the method can include accepting a user input to add a test to the sets of tests.

In various embodiments, the method can include determining whether a compute node hosting a stage instance of a first ETL job is simultaneously hosting a second ETL job at a first time, and determining whether the compute node hosting the stage instance of the first ETL job is simultaneously hosting the second ETL job at a second time, the second time being prior to first time.

Various embodiments are directed to a computer system and a computer program product for generating a performance determination report for an ETL job.

The above summary is not intended to describe each illustrated embodiment or every implementation of the present disclosure.

Figure 1:
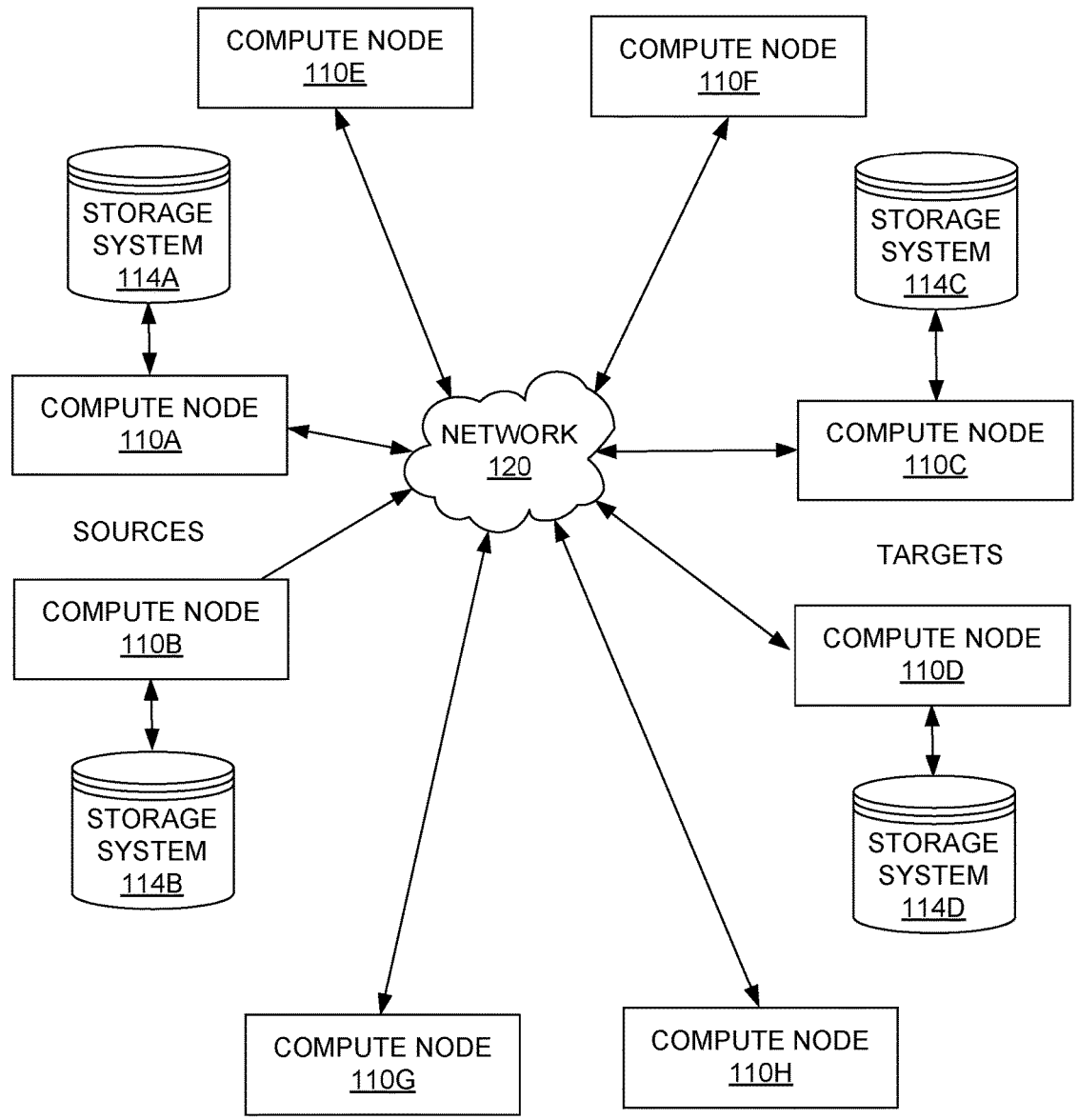
FIG. 1 illustrates a computing infrastructure configured to execute an Extract, Transform, Load computing application according to various embodiments.

The same numbers may be used in the Figures and the Detailed Description to refer to the same devices, parts, components, steps, operations, and the like. While the concepts and embodiments described in this disclosure are amenable to various modifications and alternative forms, specifics thereof have been shown by way of example in the drawings and will be described in detail. It should be understood, however, that the intention is not to limit the claims to the particular embodiments described. On the contrary, the intention is to cover all modifications, equivalents, and alternatives falling within the spirit and scope of the invention.

DETAILED DESCRIPTION

Aspects of this disclosure relate to systems that run Extract, Transform, and Load (ETL) jobs and, more particularly, to a performance checking component for an ETL job. While the present disclosure is not necessarily limited to these applications, various aspects of the disclosure may be appreciated through a discussion of various examples using this context.

In an enterprise environment, the operation and performance of an ETL job depends on many factors, such as the operating platform, third party library installation, resources that the ETL job accesses and their availabilities, network connectivity, and other factors. An ETL job that performs satisfactorily on a development or test platform may not meet expectations when run on a production system. Because ETL jobs consist of many stage instances which access multiple databases, file systems, Enterprise Resource Planning systems, and other data storage mechanisms running in parallel, within the same job design, it is difficult to determine where to look first when an issue occurs. According to various embodiments of this disclosure, one or more likely causes for a degradation or failure of performance of an ETL job can be automatically determined. More specifically, various embodiments are directed to an ETL health/performance checking component that automatically determines a source of degradation or failure of performance of a particular ETL job.

In various embodiments, a method includes decomposing an ETL job into its stage instances. Once the job is decomposed, one or more conditions for each of the stage instances are identified. In addition, the method includes generating a set of tests for each of the identified conditions. The sets of tests are performed. The tests may be explicitly invoked by a user or automatically invoked by a system. Additionally, the method includes determining whether a test result from the sets of tests is outside a first range. Historical data obtained from performing the tests at an earlier point in time can be used to determine whether a particular test result is outside a first range and, accordingly, a likely culprit, i.e., source or cause, of the problem. Further, the method includes determining whether other ETL jobs are simultaneously using the same resources as the particular job being tested. The output of the method is a description of the culprit in the form of a performance determination report along with, in some embodiments, a recommended action to resolve the problem and performance issue.

FIG. 1 illustrates a computing infrastructure configured to execute an ETL computing application according to various embodiments. The computing infrastructure 100 includes two or more compute nodes 110A-110H—i.e., hosts—which are communicatively coupled to each other using one or more communications networks 120. The communications network 120 may include one or more servers, networks, or databases, and may use a particular communication protocol to transfer data between the compute nodes. The computing infrastructure 100 includes two or more storage systems 114A-114D, which may be any type of database. The compute nodes 110A-110D may be configured as servers for accessing an associated storage system 114A-114D. In the example of FIG. 1, the storage systems 114A and 114B may be sources, while the storage systems 114C and 114D may be targets. The compute nodes 110E-110G may be configured to perform data transformation functions of a particular ETL job. The compute node 110H may be configured to generate a configuration file and to perform tests specified in the configuration file, according to various embodiments.

Figure 2A:
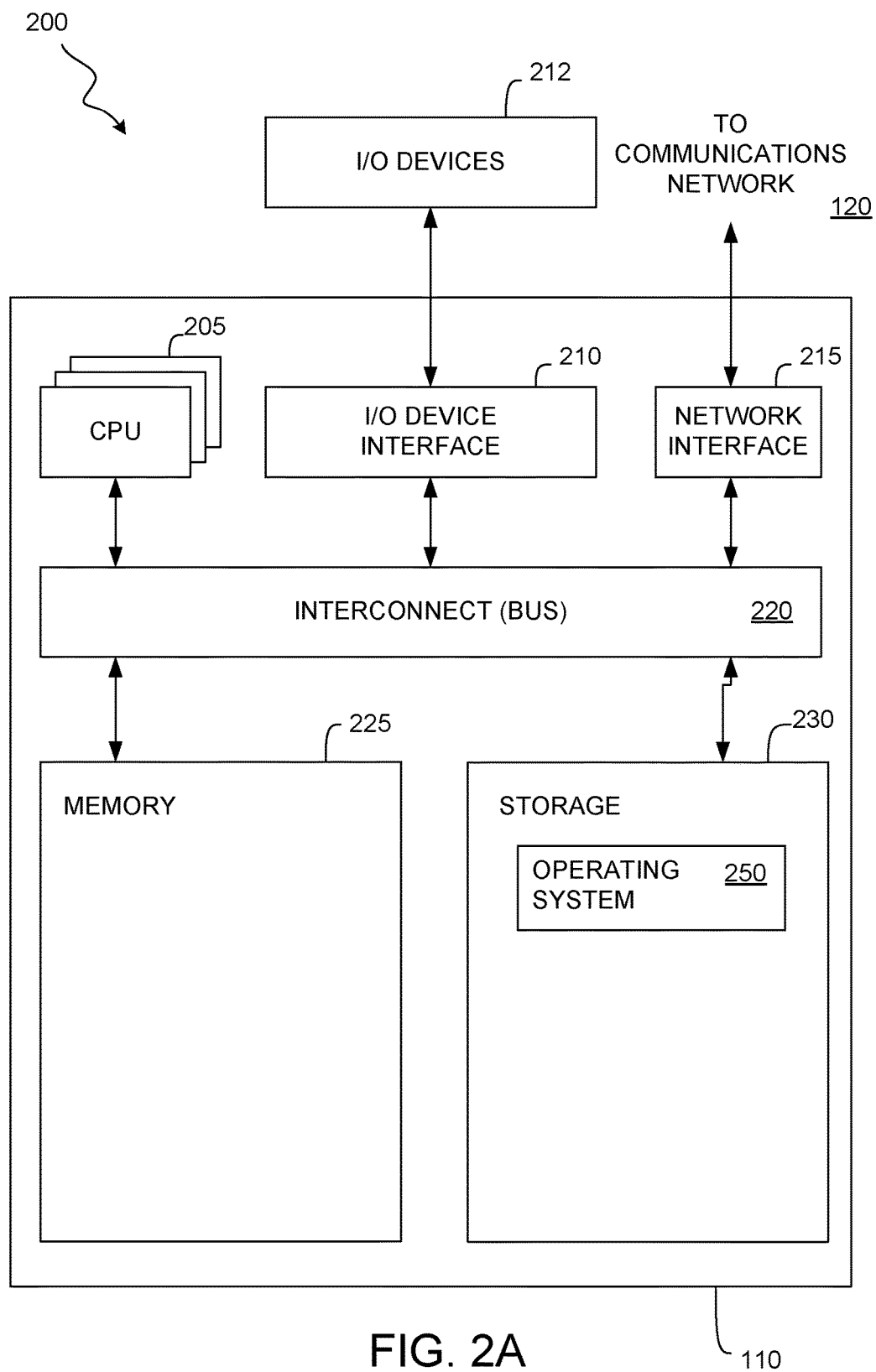
FIGS. 2A and 2B illustrate a more detailed view of a compute node of FIG. 1 according to various embodiments.
Figure 2B:
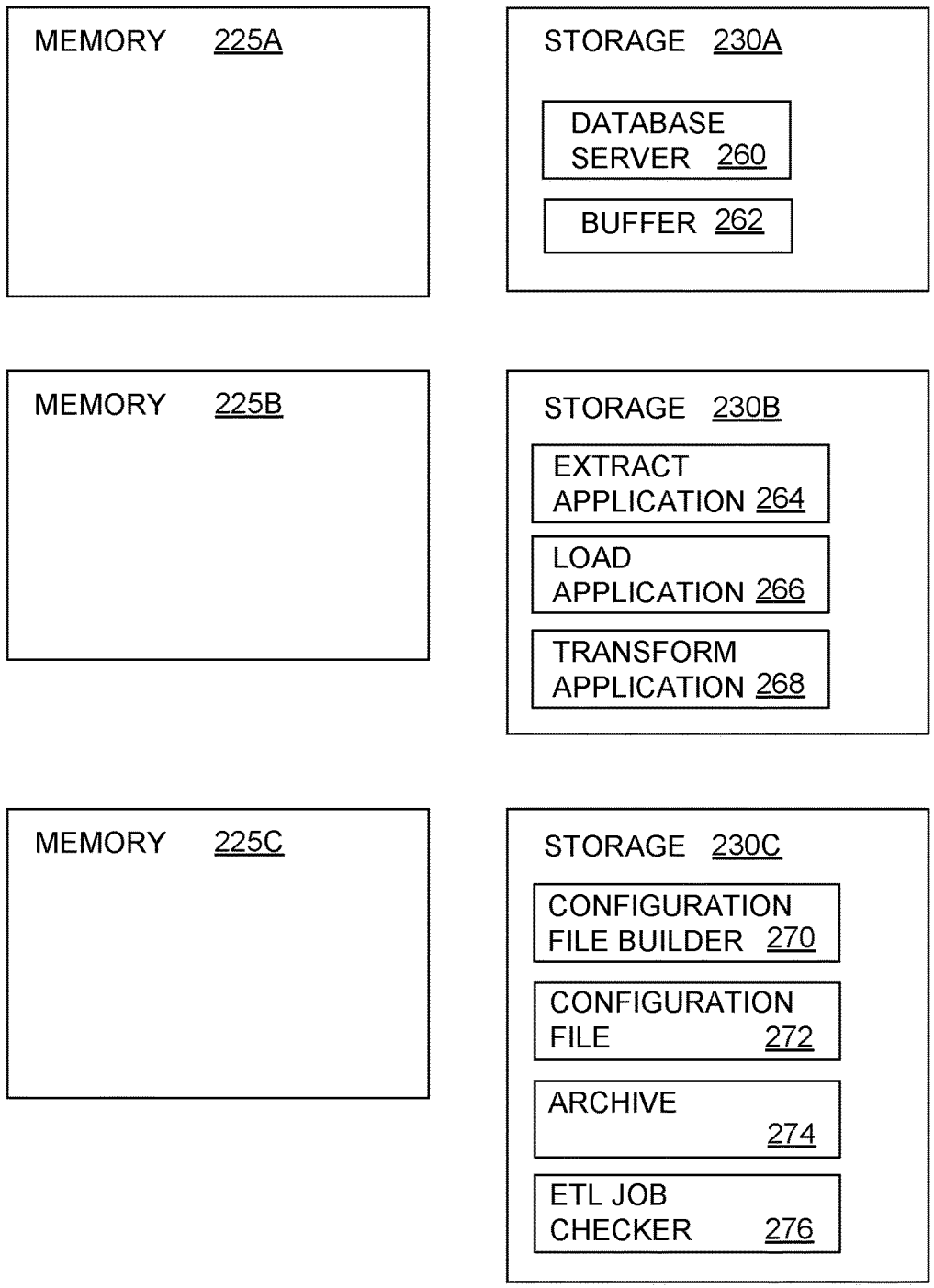

FIGS. 2A and 2B present a more detailed view of a compute node 110, which may be the same as one of the compute nodes 110A-110H of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In an embodiment, a processor 205 may be a digital signal processor (DSP).

The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

The compute node 110 may include one or more operating systems 250. An operating system 250 may be stored partially in memory 225 and partially in storage 230. Alternatively, an operating system may be stored entirely in memory 225 or entirely in storage 230. The operating system provides an interface between various hardware resources, including the CPU 205, and various components shown in FIG. 2B, as well as known components generally provided and omitted so as to not unnecessarily obscure embodiments of the invention. In addition, an operating system provides common services for application programs, such as providing a time function.

FIG. 2B depicts an example of the memory 225A and storage 230A for one of the compute nodes 110A-110D, which can be configured to facilitate access to an associated source or target storage system 114A-114D. A database server application 260 and a buffer 262 may be stored partially in memory 225A and partially in storage 230A. Alternatively, the database server application 260 and buffer 262 may be stored entirely in memory 225A or entirely in storage 230A.

In addition, FIG. 2B depicts an example of the memory 225B and storage 230B for one of the compute nodes 110E-110G, which can be configured to perform data transformation functions of a particular ETL job. An extract application 264, a load application 266, or a transform application 268 may be stored partially in memory 225B and partially in storage 230B. Alternatively, the extract application 264, load application 266, or transform application 268 may be stored entirely in memory 225B or entirely in storage 230B. In various embodiments, only one of the three applications 264, 266, and 268 are stored in the memory 225B and storage 230B, depending on the function that the particular compute node 110E-110G serves. For instance, a compute node 110G that only serves to perform a transform function may store only a transform application 268 in the memory 225B and storage 230B.

FIG. 2B also depicts an example of the memory 225C and storage 230C for the compute node 110H, which can be used to generate a configuration file, to perform tests specified in the configuration file, or both. A configuration file builder 270, a configuration file 272, an archive 274, and ETL job checker 276 may be stored partially in memory 225C and partially in storage 230C. Alternatively, the configuration file builder 270, configuration file 272, archive 274, and ETL job checker 276 may be stored entirely in memory 225C or entirely in storage 230C.

Figure 3:
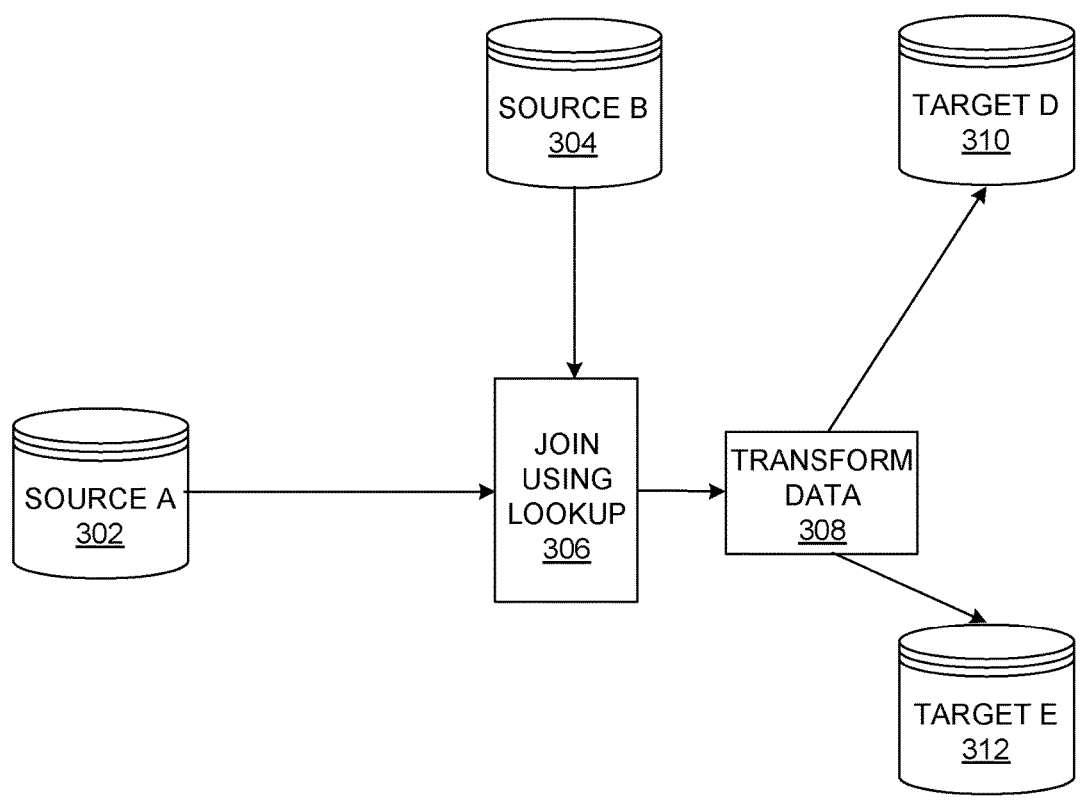
FIG. 3 illustrates an example of a data flow in an ETL computing application according to various embodiments.

FIG. 3 illustrates a simplified example of a data flow in an ETL computing application according to various embodiments. In FIG. 3, data is extracted from source A, 302 and source B, 304. The extracted data is joined by a lookup stage, 306, processed by a transform stage, 308, and loaded to target D, 310 and target E, 312. One of ordinary skill in the art will understand that while extracted data sometimes requires little or no manipulation, at other times, extracted data requires extensive manipulation. Examples of operations that may be performed on extracted data include: selecting columns to extract, translating coded values, encoding free-form values, calculating new values from extracted values, such as calculating aggregate values, sorting, and validating data values. Transformations on extracted data may involve accessing lookup tables and accessing third-party tools to perform data calculations or manipulations.

According to various embodiments, an ETL health/performance checking component includes two phases: a configuration phase that generates a configuration file, and a runtime phase in which the configuration file is used to automatically determine one or more likely causes of a degradation or failure of performance of a particular ETL job.

Figure 4:
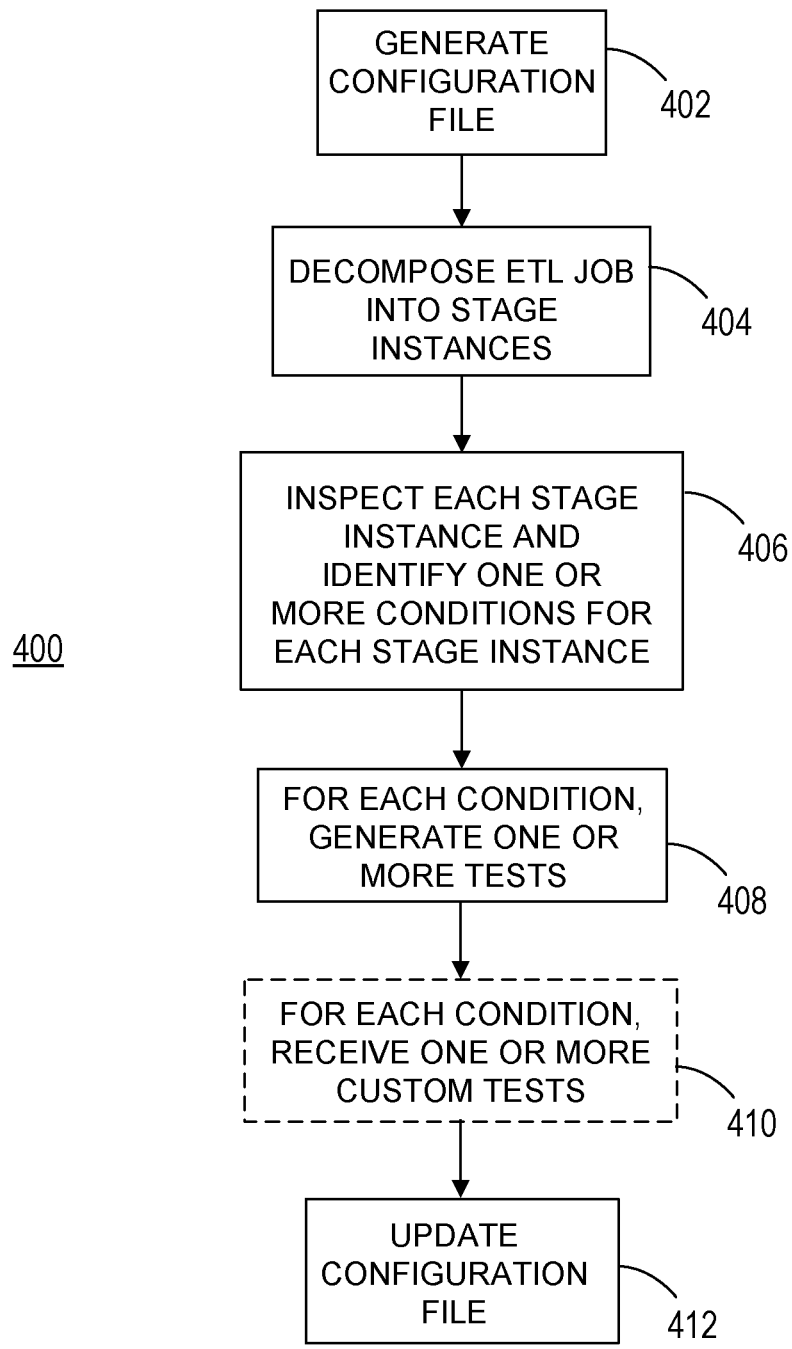
FIG. 4 is a flow chart of an example of a process for generating a configuration file according to various embodiments.

FIG. 4 depicts a flow chart of an example of a process 400 for a generating a configuration file, such as the configuration file 272, according to various embodiments. The process 400 can be performed by the configuration file builder 270 in various embodiments. An initial configuration file is generated in operation 402. The configuration file is not a general purpose file that may be used with any ETL job. Rather, the configuration file is targeted to and specified for a particular ETL job. Accordingly, a unique configuration file may be provided for each ETL job.

In operation 404, the targeted ETL job is decomposed into stage instances. Using the data flow of FIG. 3 as an example, an ETL job may be decomposed into a first extraction stage instance in which data is extracted for a first source and a second extraction stage instance in which data is extracted for a second source. In addition, the ETL job may be decomposed into a first data validation instance in which data from the first source is validated and a second data validation instance in which data from the second source is validated. Further, the ETL job may be decomposed into a join stage instance in which data from the first and second sources are joined, a sorting stage instance in which the joined data is sorted, and transfer stage instance in which the joined data is loaded to either a first target or a second target, depending on a sorting criteria.

In operation 406, each of the stage instances is inspected. Continuing to use the data flow of FIG. 3 as an example, the first extraction stage instance may be inspected to determine the identity of the first data source, the schema, file entity or queue employed by the first data source, the user credentials employed by the first data source, and information about the communication link between the first data source and the first extraction stage instance. Metadata or configuration data for a stage instance may be inspected. These are but a few examples of items that may be inspected. In operation 406, a stage instance is inspected for any relevant item. As a result of the inspection operation 406, properties and parameters for each stage instance are identified.

In addition, in operation 406, each stage instance is inspected and one or more conditions for each stage instance are identified. Conditions may be identified based on the identified properties, parameters, and metadata used by the stage instance. Conditions can be classified by type of stage. For example, certain conditions may be applicable to a source or target stage instance. Other conditions may be applicable to a transform or processing stage instance. Some conditions can be applicable to both classifications of stage instances.

Conditions applicable to a source or target stage instance can include, but are not limited to, a table or data sizing condition (also referred to as a "free non-volatile memory condition"), a network reliability condition, a network configuration condition, a database or application availability condition, a database query performance condition, an SQL (structured query language) execution plan condition, a schema validity condition, installed libraries or configuration parameter conditions, a temporary memory space condition (also referred to as a "free volatile memory condition"), and other suitable conditions. Conditions applicable to a data transform or processing stage instance can include, but are not limited to, installed libraries or configuration parameter conditions, a temporary memory space condition (also referred to as the "free volatile memory condition"), a third party tool condition, and other suitable conditions.

In operation 408, one or more tests are generated for each identified condition. In various embodiments, each condition may have numerous tests.

With regard to source or target stage instances, a test of a table or data sizing condition can include querying an operating system for the hardware platform on which the stage instances runs to determine a quantity of persistent or non-volatile storage, e.g., disk, that is available to store a database table or file structure.

A test of a network reliability condition can include a ping test or a test transaction test to determine the speed, latency and operability of a communication link.

A test of a network configuration condition can include checking the transport speed for the network interface, detecting whether network link aggregation is utilized, and determining maximum transmission unit (MTU) size for comparison with prior invocations to identify differences that may be triggered by changes to the configuration of a system.

A test of a database or application availability condition can include a database ping, an active listener for port availability, a fetch or store transaction to determine whether the database or application is operable. A test of a database query performance condition can include multiple fetch or store transactions to determine a rate at which the database can respond to requests. For example, a database query test can generate a run rate metric, expressed in rows per second as well as the amount of time that it takes to return the first row, when available for the result set, expressed in milliseconds.

A test of a schema validity condition can include a comparison of a schema used by a database with a schema used by a source or target stage instance. A source schema file can be fetched from a database or a source stage instance. The database or source schema file can be compared to a schema expected by a processing or target stage instance. In an alternative embodiment, a database or source stage instance can be queried and the query result parsed to determine whether it conforms to an expected schema. A schema validity test can use the result of a comparison of an actual and an expected schema to identify different or incompatible schemas.

A test to generate an SQL execution plan that is used by a source or target database instance can include fetching the execution plan for comparison with prior invocations of the plan to identify differences that may be triggered by source or target database changes.

A test of an installed libraries condition can include comparing libraries installed on the compute node where the stage instance runs, and their versions, with libraries and versions known to be required for the stage instance. A library test can identify missing or outdated libraries. Similarly, a configuration parameter condition can include a test that compares configuration parameters installed on the compute node where the stage instance runs with parameters known to be required. A configuration parameter test can identify any incorrect or missing configuration parameters.

A test of a temporary memory space condition can include determining the amount of volatile memory, e.g., DRAM, SRAM, that is available at the compute node on which the stage instance is to be run, and comparing the amount of free volatile memory with the amount of memory needed by the stage instance. The temporary memory space is used by some stage instances to store temporary work tables to speed up processing, or flat files or named pipes for high performance loads using native database utilities.

A test of a third party tool condition can include performing test data calculations and transformations that invoke use of the third party tool. For example, a third party tool can be used to translate coded values, encode free-form values, calculate new values from extracted values, and to validate data values.

In optional operation 410, in various embodiments, one or more tests can be received from a user for each identified condition. The operation 410 allows a user to add custom tests to those tests automatically produced by the configuration file builder 270 in operation 408.

In addition, operation 410 may include displaying the conditions and tests configuration file builder 270 has produced for the particular ETL job. The automatically generated conditions and tests can be displayed to the user as "default" tests. The display can be interactive, providing a mechanism for a user to select and customize the default conditions and tests, as well as providing a mechanism for supplementing the default tests with one or more custom tests. For example, one custom test for a data source could be a test of whether a connection test to data source A, 302 is successful. As an example of a customizing a default test for a data source, a test that determines the time to complete a query round trip could be combined with a test to determine whether the round trip query time is within a standard deviation of a mean round trip query time for the data source. The mean round trip query time can be determined from historical performance results that may be stored in archive 274.

In operation 412, the initial configuration file that was generated in operation 402 is updated. The update in operation 412 inserts all the stage instances into the configuration file. The update inserts all of the conditions that were are identified for each stage instance into the configuration file. In addition, operation 412 inserts all of the tests that were generated or received for each identified condition, along with suitable metadata, into the configuration file. The end result of the process 400 is a configuration file 272 for a specific ETL job.

Figure 5:
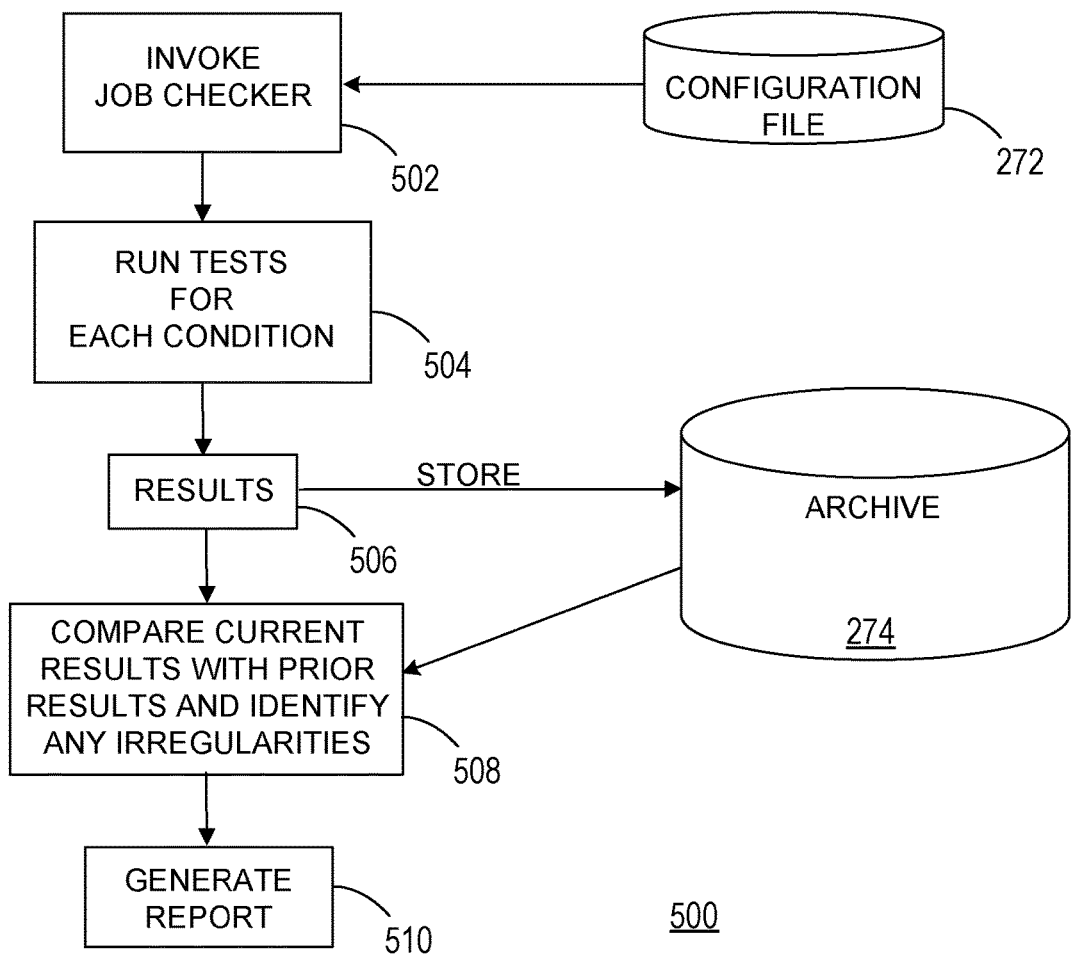
FIG. 5 is a flow chart of an example of a process for a runtime phase that checks the health or performance of an ETL job according to various embodiments.

FIG. 5 depicts a flow chart of an example of a process 500 for a runtime phase that checks the health or performance of an ETL job according to various embodiments. According to various embodiments, the process 500 automatically determines a source of degradation or failure of performance of a particular ETL job. The process 500 can be performed by the ETL job checker 276 in various embodiments. In operation 502, the ETL job checker 276 is invoked. Invoking the ETL job checker 276 includes specifying a configuration file 272 that could be produced by the configuration file builder 270 according to the process 400, in various embodiments. The configuration file 272 is generated for a particular ETL job.

In operation 504, the job checker performs the set of tests included in the configuration file 272 for the particular ETL job. The configuration file 272 can include a set of tests for each identified condition. The set of tests for an identified conditions may include only one test or may include numerous tests. It is not expected to be common, but it is possible that a set of tests for one of the identified conditions could include no tests, i.e., a null set. For example, a particular stage instance could be known to be reliable and, for this reason, a test might not be included in the set of tests. In operation 506, a set of test results for each condition are obtained and stored in an archive 274.

The ETL job checker 276 can be explicitly invoked and run by a developer for an ETL job in a test environment. Alternatively, the ETL job checker can be run automatically when an ETL job is tested in an ETL design tool. In these cases, the set of test results generated may be the only tests results for the particular ETL job. In these cases, it may not be feasible to compare an initial set of test results with any other set of test results. In these situations, any tests that failed are identified in operation 508. In addition, in these cases, a test result may be compared with a user-defined range of test results known or assumed to be acceptable in operation 508. In operation 510, the test results are reported or displayed to the user for these cases where historical test results are not yet available.

The ETL job checker 276 can also be invoked and run at any time by a system administrator using a command line script, graphical user interface, or web interface. In addition, the ETL job checker 276 can be invoked and run using a scheduler, such as the Unix cron utility. Using these methods, the ETL job checker 276 can be invoked and run for a particular ETL job in a production or other environment at a time when one or more sets of prior test results are available. If a set of prior test results generated in a test environment are sufficiently similar to or the same as the production environment, the prior test results may be treated as and used as historical test results for comparison with current test results. Alternatively, any previously generated test results from a similar or the same production environment may be used as historical test results for comparison with current test results.

In operation 508, the set of test results obtained in operation 506 are compared with one or more sets of historical test results. Historical test results may be stored in the archive 274. Where a first set of tests (for the results obtained in operation 506) are performed at a first point in time and the same set of tests (or a test from the same set of tests) is performed at a second point in time, the second test result(s) obtained at the second point in time may be referred to as a historical, previous, or prior test result or results if the second time is before or prior to the first time. Operation 508 includes determining whether a result of a test is outside a particular range of test results, e.g. a first range of test results. A test that fails is outside a first range of test results. For instance, a ping test that fails is outside a first range of test results. As another example, a native function that performs successfully, but requires 100 ms is outside a first range of test results if the first range is specified as 1-10 ms. For tests that fail or underperform, i.e., test results that are outside the first range of test results, the ETL job checker 276 can determine, by comparing current test results with one or multiple sets of prior or historical test results, whether the particular failure has ever happened before. For example, it could be determined that the test condition that failed or underperformed today also failed or underperformed two weeks ago.

In various embodiments, determining the first range of test results for a first test includes calculating one or more statistical metrics from two or more prior performances of the first test. Examples of statistical metrics include average, mean, median, mode, maximum, minimum, average maximum, or average minimum value, as well as measures of dispersion, such as standard deviation. A statistical metric by itself can determine the first range, for example, average maximum, average minimum value, or one standard deviation. Alternatively, a statistical metric along with another parameter can determine the first range, for example, average value plus or minus ten percent.

In one embodiment, an optional feature permits a user to enter a resolution of a failed or underperforming condition in a history database in the archive 274. For example, the sets of historical test results stored in the archive 274 can include a set of tests results that coincided with a significant ETL system problem. A cause and problem solution could be entered by a user into the history database in the archive 274 as a post problem resolution procedure. With this option, it could be determined that the test condition that failed or underperformed in a current test also failed or underperformed in a previous text, e.g., two weeks ago. The cause, resolution, or any other pertinent facts could be displayed to a user.

In various embodiments, the ETL job checker 276 can be configured to determine whether any of the compute nodes hosting a stage instance of a first ETL job are simultaneously hosting a second ETL job. In addition, data regarding whether other ETL jobs are being simultaneously hosted when the first ETL job is running can be stored in the archive 274. For example, assume that first and second ETL jobs are used by a particular business enterprise. The ETL job checker 276 is used to determine the source of a performance issue in the first ETL job. In operation 508, when the ETL job checker 276 is evaluating the performance of the first ETL job, it can determine that the second ETL job is simultaneously being hosted on a common compute node. Once it is determined that the second ETL job is using a common compute node, the ETL job checker 276 can check the data stored in the archive 274 to determine whether the second ETL job has been simultaneously run with the first job on the common compute node in the past. As an example, the ETL job checker 276 determines that a "condition 4" last worked without a performance issue yesterday at 5 PM ET. The ETL job checker 276 searches history database to determine what other ETL jobs are using compute node D, which is experiencing a performance issue. The search identifies that two new ETL jobs were created to use compute node D yesterday after 5 PM. As a result the ETL job checker 276 reports a potential resource contention issue on compute node D, which may be a likely cause for the current failure or underperformance of the "condition 4."

In operation 510, a report the results of the tests for the particular ETL job is generated. The report can be viewed online by the user. Alternatively, or additionally, the report can be sent to an ETL platform vendor or other entity providing product support.

Figure 6:
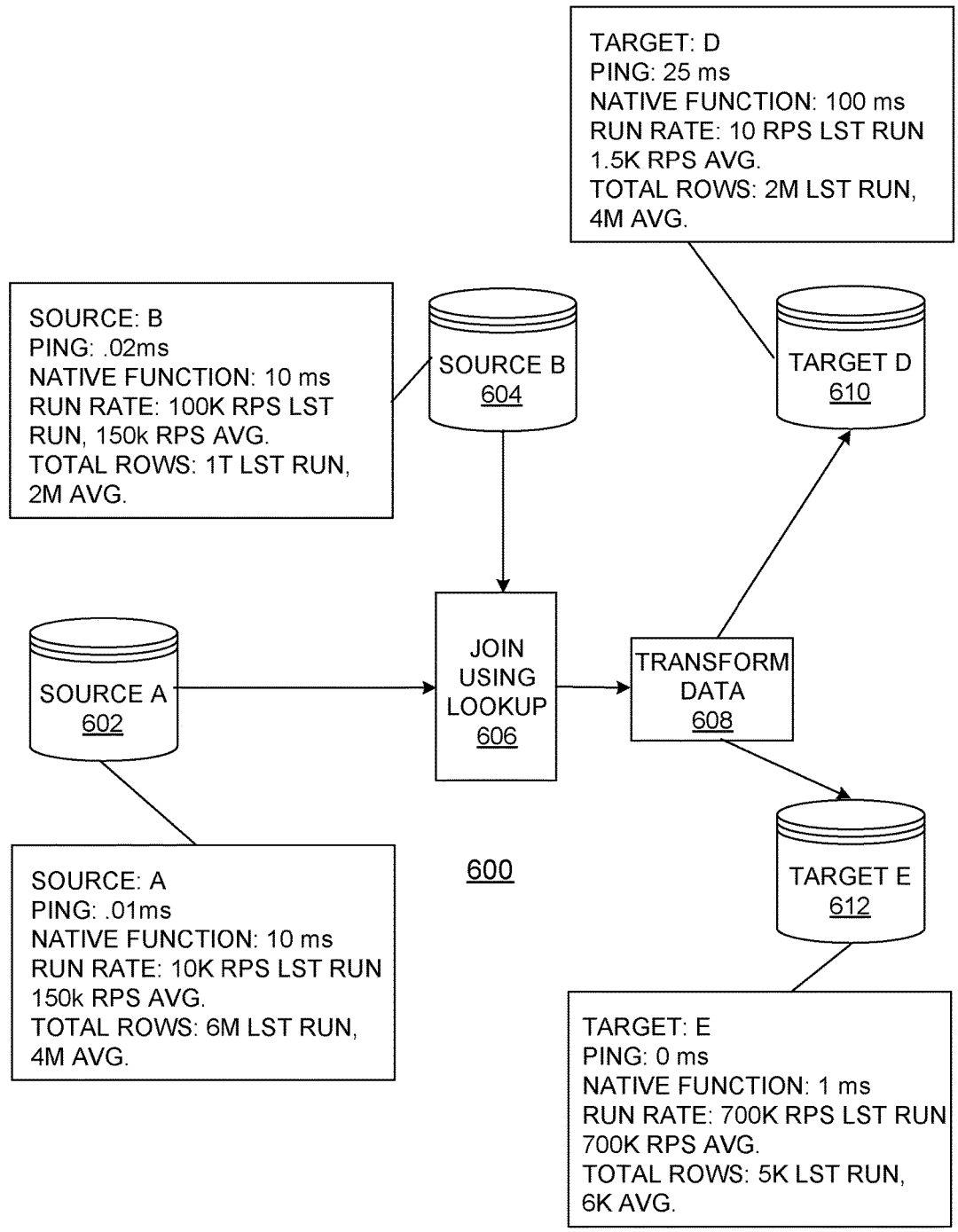
FIG. 6 is the example data flow of FIG. 3 illustrating test reports of test results for conditions of stage instances according to various embodiments.

FIG. 6 is the example data flow of FIG. 3 illustrating test results for conditions of stage instances according to various embodiments. For example, a report of test results indicates the results of a ping test, a native function test (e.g., a fetch from a database), a current run rate test (expressed in RPS (rows per second) and denoted "LST RUN"), and a total rows test (also denoted "LST RUN"). In addition, average rows per second and average total rows are presented in the report of test results. The average rows per second and average total rows are determined from historical data. The report of test results is presented for the shown stage instances.

Aspects of the present disclosure may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method performed by a processor, comprising:
    decomposing an Extract, Transform, and Load (ETL) job into two or more stage instances, the two or more stage instances including a first extraction stage instance and a second extraction stage instance, a first data validation stage instance and a second data validation stage instance, a transform stage instance, and a transfer stage instance;
    identifying one or more conditions for each of the stage instances, the one or more conditions including a network reliability condition for the first and second extraction stage instances and for the transfer stage instance, the one or more conditions including a database performance condition for the first and second data validation stage instances, and the one or more conditions including a third party tool condition for the transform stage instance;
    generating a set of tests for each of the one or more conditions, wherein each set of tests includes one or more tests for a corresponding condition, wherein the set of tests for the network reliability condition includes a ping test, the set of tests for the database performance condition includes a database query test, and the set of tests for the third party tool condition includes a test to validate transformed data values;
    extracting data from a first source in the first extraction stage instance and extracting data from a second source in the second extraction stage instance;
    validating data values for the first source in the first data validation stage instance and validating data values from the second source in the second data validation stage instance;
    transforming the data from the first source and second source in the transform stage instance, generating a first joined data;
    transferring the first joined data to one or more target databases in the transfer stage instance;
    generating a first test result for the ETL job by performing a first set of tests during a runtime phase of the ETL job;
    saving the first test result to an archive, the archive including data of a second test result and one or more resolutions for an underperforming condition, the second test result being generated by performing the first set of tests on a prior ETL job;
    determining a first range for the first test result by calculating an average and a standard deviation from two or more historical test results, the two or more historical test results including the second test result, and wherein the first range is one standard deviation from the average;
    determining that the first test result from the first set of test results is outside of the first range by comparing the first test result with the first range;
    generating a performance determination report, the performance determination report including the first test result; and
    providing the performance determination report to a user.

* * * * *